United States Patent

Arai et al.

Patent Number: 5,266,631
Date of Patent: Nov. 30, 1993

[54] PROCESS OF PRODUCING ROOM TEMPERATURE CURABLE ORGANOPOLYSILOXANE COMPOSITION

[75] Inventors: Masatoshi Arai; Kazutoshi Fujioka, both of Annaka; Yuki Tateyama, Takasaki, all of Japan

[73] Assignee: Shin-Etsu Chemical Co., Ltd., Tokyo, Japan

[21] Appl. No.: 897,853

[22] Filed: Jun. 12, 1992

[30] Foreign Application Priority Data

Jun. 13, 1991 [JP] Japan .................................. 3-168903
Oct. 16, 1991 [JP] Japan .................................. 3-296481

[51] Int. Cl.$^5$ .............................................. C08K 3/36
[52] U.S. Cl. .................................. 524/847; 524/863
[58] Field of Search ................................ 524/863, 847

[56] References Cited

U.S. PATENT DOCUMENTS

| 4,525,565 | 6/1985 | Laisney et al. | 524/863 |
|---|---|---|---|
| 4,888,380 | 12/1989 | Kamis et al. | 524/863 |
| 4,973,623 | 11/1990 | Haugsby et al. | 524/863 |
| 5,013,781 | 5/1971 | Koshii et al. | 524/863 |
| 5,061,739 | 10/1991 | Shimizu | 524/863 |
| 5,087,684 | 2/1992 | Perrin | 524/863 |

Primary Examiner—Ralph H. Dean
Assistant Examiner—Karen A. Dean
Attorney, Agent, or Firm—Oblon, Spivak, McClelland, Maier & Neustadt

[57] ABSTRACT

The present process of producing a room temperature curable organopolysiloxane composition is characterized in that an organopolysiloxane represented by the following general formula (1) or (2):

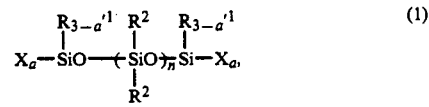

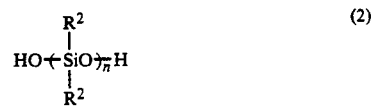

wherein X represents a hydrolyzable group such as an alkoxy group, $R^1$ and $R^2$ each represent a monovalent hydrocarbon group such as an alkyl group and a phenyl group, n is a positive integer, and a is 2 or 3, and a finely divided silica are mixed and thereafter a condensation catalyst is mixed. According to the present process, a curable composition which will not slump can be obtained without using a slump preventive.

5 Claims, No Drawings

PROCESS OF PRODUCING ROOM TEMPERATURE CURABLE ORGANOPOLYSILOXANE COMPOSITION

BACKGROUND OF THE INVENTION

1. Field of the Invention

The present invention relates to a process of producing a room temperature curable organopolysiloxane that can be easily cured with moisture to form a rubberlike elastic cured product, and more particularly to a process of producing a room temperature curable organopolysiloxane composition which is effectively inhibited from slumping before it is cured.

2. Description of the Prior Art

Hitherto, room temperature curable organopolysiloxane compositions that can easily be cured with moisture to form a rubberlike elastic cured product are widely used, for example, for adhesives, coating materials, electrical insulating seal materials, and sealing materials for industry and construction. Among these, the case where they are used for sealing materials for industry and construction requires that the composition will not slump before the composition is cured.

To obtain such a composition which will not slump, generally a slump preventive is added. As the slump preventive, for example, a polysiloxane having phenyl groups (U.S. Pat. No. 4,100,129), a polyoxyalkylene compound (Japanese Pre-examination Patent Publication (kokai) No. 56.853 (1981), and a polyoxyalkylene compound having a hydrolyzable silicon-containing organic group at an end of the molecule (Japanese Pre-examination Patent Publication (kokai) No. 62-135560 (1987) are known.

However, the above-mentioned slump preventives are poor in compatibility with organopolysiloxanes that are base polymers of the compositions and are accompanied by a problem that they lower the transparency of the compositions. Further, where these slump preventives are used, it is needed that the surface of a finely divided silica used as a filler is treated with an organosilicon compound such as a dimethydichlorosilane and therefore a disadvantage of a higher cost cannot be evaded. That is, if untreated finely divided powder silica that is low in cost is used as a filler, there is a problem that the effect of slump prevention cannot be exhibited fully.

Also, methods for obtaining a room temperature curable composition which will not slump without using a slump preventive is known, and, for example, Japanese Pre-examination Patent Publication (kokai) No. 02-41361 (1990) suggests a method wherein an organopolysiloxane having hydroxyl groups is mixed previously with a crosslinking agent, and thereafter the resulting mixture is mixed with a finely divided powder silica, a curing catalyst, etc.

However, the above-mentioned method of obtaining a room temperature curable composition without using a slump preventive can only be applied to an oxime-elimination type composition, the obtained composition is poor in transparency and the shelf stability is unsatisfactory.

SUMMARY OF THE INVENTION

Therefore, an object of the present invention is to provide a process of producing a room temperature curable organopolysiloxane composition which is inhibited from slumping without using a slump preventive and is excellent in transparency and shelf stability.

According to the present invention, there is provided a process of producing a room temperature curable organopolysiloxane composition, comprising the steps of mixing uniformly 100 parts by weight of (A) at least one organopolysiloxane selected from the compounds represented by the following general formulas (1) and (2):

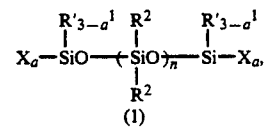

(1)

and

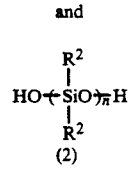

(2)

wherein X's, which may be the same or different, each represent a group selected from the group consisting of an acyloxy group, an alkoxy group, an alkenyloxy group, and a ketooxyimino group, $R^1$ and $R^2$, which may be the same or different, each represent an unsubstituted or substituted monovalent organic group, n is a positive integer, and a is 2 or 3, and 1 to 50 parts by weight of (B) a silica powder having a specific surface area of 50 $m^2/g$ or more and an adsorbed water content of 0.5% or less, and then mixing with 0 to 10 parts by weight of a condensation catalyst (C).

DETAILED DESCRIPTION OF PREFERRED EMBODIMENTS

(A) Organopolysiloxanes

In the present invention, as the organopolysiloxane that is the component (A) serving as a base polymer, at least one organopolysiloxane represented by the above general formula (1) or (2) can be used.

The organopolysiloxane of the general formula (1) has reactive organic groups X at both ends of the molecular chain and possesses such a property due thereto that it can be cured without any special crosslinking agent. That is, the use of the organopolysiloxane of the general formula (1) as the component (A) makes it unnecessary for a crosslinking agent to be blended, which is quite advantageous in view of the transparency.

The organopolysiloxane of the general formula (2) has hydroxy groups at the both ends of the molecular chain. In this case, although it is required to blend a crosslinking agent, by using as a crosslinking agent a specific iminoxysilane described later and blending that iminoxysilane in two steps at specified timing, a curable composition which is inhibited from slumping can be obtained. The composition obtained herein is excellent in a property that when the composition is cured after being filled, for example, into a masonry joint, the surface of the formed cured product will have no cracks even if the masonry joint is displaced before the completion of the curing of the composition (the property is called movement crack resistance hereinafter).

The reactive organic group X in the above general formula (1) includes an acyloxy group such as an acetoxy group, an alkoxy group such as a methoxy group, an ethoxy group, and a propoxy group, an alkenyloxy group such as a vinyloxy group and a propenyloxy group, and a ketooxyimino group such as a methylethylketooxymino group.

Examples of groups $R^1$ and $R^2$ in the general formulae (1) and (2) include organic groups having 1 to 10 carbon atoms, preferably 1 to 8 carbon atoms, for example, an alkyl group such as a methyl group, an ethyl group, a propyl group, and a butyl group, an aryl group such as a phenyl group and a tolyl group, an alkenyl group such as a vinyl group and an allyl group, a cycloalkyl group such as a cyclohexyl group, and an aralkyl group such as a benzyl group and a phenylethyl group, and corresponding substituted groups in which part or all of the hydrogen atoms of the above organic groups have been replaced by a halogen atom(s), a cyano group(s), and/or the like, such as a chloromethyl group, a trifluoropropyl group, and a cyanoethyl group. Further, preferably n is in the range of 50 to 2,000 in view of the viscosity, the workability, etc.

In the present invention, as the organopolysiloxane represented by the general formula (1), for example, the following can be used preferably:

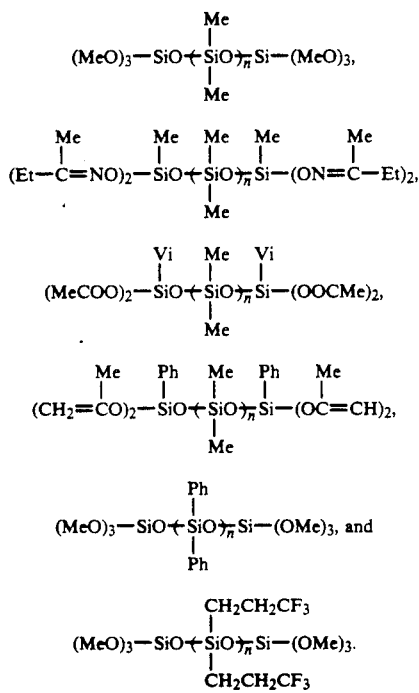

In the above formulae, Me denotes a methyl group, Et denotes an ethyl group, Vi denotes a vinyl group, and Ph denotes a phenyl group.

Additionally stated for reference, the organopolysiloxane represented by the above general formula (1) can be easily obtained by heating a hydroxy-terminated polysiloxane and a silane compound having the corresponding reactive groups X (that is usually used as a crosslinking agent), if required, together with a suitable catalyst. For example, in the case where the reactive organic groups X are acyloxy groups or ketooxyimino groups, the particular organopolysiloxane can be obtained by reacting a hydroxy-terminated polysiloxane with an acyloxysilane or a ketooxyiminosilane at a temperature of 50° to 90° C. for 10 min to 2 hours. If the reactive organic groups X are alkoxy groups, a hydroxy-terminated polysiloxane and an alkoxysilane are reacted at 150° C. or over for 24 hours or over to obtain the particular organopolysiloxane. Further, if the reactive organic groups X are alkenyloxy groups, a hydroxy-terminated polysiloxane and an alkenyloxysilane are reacted at 50° to 90° C. for 2 to 4 hours using as a catalyst a basic compound such as triethylamine and thereafter removing the catalyst by reducing the pressure to obtain the particular organopolysiloxane.

Further, in the present invention, as the hydroxy-terminated organopolysiloxane represented by the general formula (2), for example, the following can be used preferably:

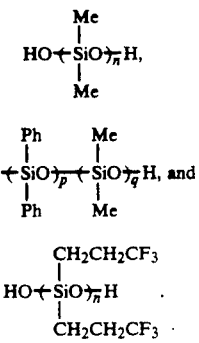

In the above formulae, p and q are each an integer of 0 or greater.

(B) Finely Divided Silicas

In the present invention, a finely divided powder silica having a specific surface area of 50 $m^2/g$ or over, preferably 70 $m^2/g$ or over, most preferably 100 $m^2/g$ or over is used and it is important that the adsorbed water content of the finely divided powder silica is in the range of 0.5% or less, particularly in the range of 0.2% or less. If the adsorbed water content is over 0.5%, the the shelf stability of the obtained composition lowers disadvantageously. This adsorbed water content can be measured, for example, by the Grignard method and the control of the adsorbed water content can be easily effected, for example, by drying by heating.

In the present invention, so long as the specific surface area and the adsorbed water content are within the above ranges, a dry process silica, a wet process silica, a calcined silica, or the like can be used as it is without subjecting it to any particular surface treatment, which is quite advantageous economically. Indeed, a surface-treated silica obtained by treating the surface of these finely divided silicas with an organochlorosilane, a polyorganosilane, or an organosilazane can be used.

The above finely divided silica is used in an amount of 1 to 50 parts by weight, preferably 5 to 40 parts by weight, per 100 parts by weight of the above component (A). If the amount to be used is less than 1 part by weight, the cured product formed from the obtained composition is unsatisfactory in mechanical strength, while if the amount to be used is more than 50 parts by weight, the fluidity of the obtained composition becomes extremely poor and the obtained composition becomes difficult to be used as a sealing material.

(C) Condensation Catalyst

In the present invention, the condensation catalyst that is the component (C) is used for accelerating the curing of the composition and as the condensation catalyst, conventionally used condensation catalysts can be used. For example, use is made of organotin compounds such as dibutyltin dimethoxide, dibutyltin diacetate, dibutyltin dioctoate, dibutyltin dilurate, dimethyltin dimethoxide, and dimethyltin diacetate, organotitanium compounds such as tetrapropyl titanate, tetrabutyl titanate, tetra-2-ethylhexyl titanate, and dimethoxytitanium diacetylacetonate, and amine compounds such as hexylamine, 3-aminopropyltrimethoxysilane, and tetremethylguanidylpropyltrimethoxysilane, and their corresponding salts, which can be used singly or in combination of two or more.

The condensation catalyst is used in an amount of 10 parts by weight or less, preferably 0.001 to 10 parts by weight, and particularly preferably 0.01 to 2 parts by weight, per 100 parts by weight of the above component (A). If the amount to be used is over 10 parts by weight, failure in curing will occurs and the composition cannot fully exhibit the performance as a sealing material.

If the organopolysiloxane of the general formula (2) is only used as the component (A), the amount of the condensation catalyst (C) to be blended can be made 0.

Crosslinking Agent

In the present invention, where the organopolysiloxane of the general formula (2) is used as the organopolysiloxane which is the component (A), use can be made of at least one iminoxysilane represented by the following formulas (3) and (4):

$$R_{4-b}^3Si(ON=CR^4)_b \quad (3)$$

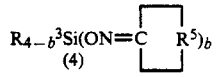
(4)

wherein $R^3$ and $R^4$, which may be the same or different, each represent a monovalent hydrocarbon group, $R^5$ represents an unsubstituted or substituted bivalent hydrocarbon group, and b is an integer of 2 to 4. Herein, examples of the monovalent groups $R^3$ and $R^4$ include those exemplified for $R^2$ in the above general formula (1). Examples of the bivalent hydrocarbon group $R^5$ include alkylene groups such as an ethylene group, a propylene group, a tetramethylene group, a methyltetramethylene group, a pentamethylene group, and a hexamethylene group, and corresponding substituted groups in which part or all of the hydrogen atoms of these alkylene groups have been replaced with a halogen atom(s), a cyano group(s), and/or the like such as a tetrafluoroethylene group.

Specific examples of such iminoxysilanes represented by the formula (3) or (4) which are preferably used are $$Si[ON=C(CH_3)(C_2H_5)]_4, \quad CH_3Si[ON=C(CH_3)_3]_3, \text{ and}$$

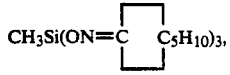

but the present invention is not limited to them.

In the present invention, the iminoxysilane is used in a molar amount 3 to 20 times the molar amount of the hydroxy groups in the organopolysiloxane of the above formula (2). If the amount to be used is short, it becomes difficult to carry out curing of the composition sufficiently, whilst if the amount to be used is too large, physical properties of the obtained cured product are affected adversely.

The iminoxysilane is divided into two portions to be added and mixed as described below in order to provide the composition with slump preventive property and movement crack resistance.

Preparation of the Composition

In the present process, basically, after the organopolysiloxane that is the above component (A) and the finely divided silica that is the above component (B) are previously mixed uniformly, mixing of the condensation catalyst that is the component (C) is effected. By effecting the mixing of the components (A) to (C) in such an order, a room temperature curable organopolysiloxane composition which is inhibited from slumping and is excellent in transparency and shelf stability can be obtained. That is, it is presumed that the mixing in the stated order results in an increase of the thixotropic properties of the composition and as a result advantages such as effective inhibition of slumping are exhibited. For instance, if the components (A) to (C) are mixed simultaneously, or the components (A) and (C) are mixed first and then the component (B) is mixed, it becomes difficult to obtain a room temperature curable composition which will not slump.

Additionally stated, in the present invention, the mixing of the components is generally carried out in the absence of moisture.

In the present invention, where the organopolysiloxane of the general formula (1) is used as the organopolysiloxane which is the component (A), the use of any crosslinking agent is not particularly required, whereas where the organopolysiloxane of the general formula (2) is used as the organopolysiloxane which is the component (A), at least one of iminoxysilanes represented by the above formulas (3) and (4) is used as a crosslinking agent as described above. In this mode, it is required that the iminoxysilane is mixed in two steps, namely, the iminoxysilane is mixed with the organopolysiloxane (A) (which is the organopolysiloxane of the general formula (2) in this case) before and after the mixing of the above finely divided silica (B).

In this case, if the amount of the iminoxysilane to be mixed in the step before the mixing of the finely divided silica(B) is assumed to be Y (mol), preferably the following formula is satisfied:

$$A_{OH} < Y < A_{OH} + 1.5 B_{OH}$$

wherein $A_{OH}$ represents the total molar amount of the hydroxyl groups of the organopolysiloxane, i.e. the component (A), and $B_{OH}$ represents the total molar amount of the hydroxyl groups of the finely divided silica, i.e. the component (B). That is, if the mixed amount (Y) of the iminoxysilane is smaller than the above range, the obtained composition becomes low in thixotropy and liable to slump. On the other hand, if the mixed amount (Y) exceeds the above range, the obtained composition becomes too high in thixotropy and liable to allow movement cracks to occur. Additionally stated, in the above conditional formula, the total amount of the hydroxyl groups of the finely divided silica means the sum of the amount of the hydroxyl groups chemically bonded to the finely divided silica surface and the amount of the hydroxyl groups in the moisture adsorbed on said finely divided powder, provided that a water molecule is assumed to contain two hydroxyl group. In this mode, after the mixing of the silica finely divided powder that is the component (B), the remainder of the iminoxysilane is mixed along with the condensation catalyst that is the component (C) which is blended optionally.

In the present invention, compounding additives which are known per se such as various fillers, pigments, dyes, adhesive-imparting agents, rust preventives, mildewproofing agents, heat resistance improvers, flame retardants, water repellents, can be mixed in the ranges which will not impair, for example, the purpose of preventing slump, and generally they are suitably added and mixed after the component (A) and the component (B) are mixed uniformly.

The thus obtained composition when exposed to the air cures readily with the moisture present in the air at room temperature to form a rubberlike elastic cured product.

This room temperature curable composition is effectively inhibited from slumping, excellent in shelf-stability, transparency, and movement crack resistance, and useful, for example, as a constructional sealing material as will become apparent from the following Examples.

EXAMPLES

In the following Examples, "parts" means "parts by weight," and the viscosity was measured at 25° C.

SYNTHESIS EXAMPLE 1

1,500 g of $\alpha,\omega$-dihydroxydimethylpolysiloxane (with a viscosity of 20,000 cSt, thereinafter referred to as oil A) and 150 g of tetramethoxysilane (TMS) were placed in a 2-l glass flask equipped with a condenser and were reacted at 140° C. for 28 hours. After the completion of the reaction, by removing excess TMS and low-boiling fractions at 140° C. under a reduced pressure of 10 mmHg, a colorless transparent oil having a viscosity of 22,000 cSt (hereinafter referred to as oil B) was obtained. From the results of the analyses by IR and NMR, it was confirmed that, in the oil B, the hydroxyl groups at the ends of the molecule of the polysiloxane, the above oil A, disappeared and methoxy groups were introduced.

SYNTHESIS EXAMPLE 2

1,500 g of oil A and 45 g of methylethylketooxyminosilane (MKS) were placed in a 2-l glass flask equipped with a condenser and were reacted at 70° C. for 2 hours. After the completion of the reaction, by removing low-boiling fractions at 140° C. under a reduced pressure of 10 mmHg, a colorless transparent oil having a viscosity of 21,000 cSt (hereinafter referred to as oil C) was obtained. From the results of the analysis by IR and NMR, it was confirmed that, in this oil C, the hydroxyl groups at the ends of the molecule of the polysiloxane, the above oil A, disappeared and oxime groups were introduced.

SYNTHESIS EXAMPLE 3

1,500 g of oil A and 75 g of vinyltriisopropenyloxysilane (VIS) were placed in a 2-l glass flask equipped with a condenser and were reacted at 120° C. for 2 hours. After the completion of the reaction, by removing excess VIS and low-boiling fractions at 140° C. under a reduced pressure of 10 mmHg, a colorless transparent oil having a viscosity of 24,000 cSt (hereinafter referred to as oil D) was obtained. From the results of the analyses by IR and NMR, it was confirmed that, in this oil D, the hydroxyl groups at the ends of the molecule of the polysiloxane, the above oil A, disappeared and isopropenyloxy groups were introduced.

EXAMPLE 1 AND COMPARATIVE EXAMPLE 1

100 parts of the oil B obtained in Synthesis Example 1 and 10 parts of dry process finely divided silica having a specific surface area of 150 mm$^2$/g and an adsorbed water content of 0.1% by weight (hereinafter abbreviated to %) (whose surface had been treated with hexamethyldisiloxane and which is referred to as silica A hereinafter) were mixed for 15 min under a reduced pressure of 10 mmHg in a universal mixer with moisture being cut off.

Then, 1 part of tetrapropoxytitanium (TPT, a condensation catalyst) and 3 parts of vinyltrimethoxysilane (VMS, a crosslinking agent) were mixed with the thus obtained mixture under a reduced pressure of 10 mmHg to obtain a composition (i) (Example 1).

Further, for comparison, 100 parts of the oil A and 10 parts of the silica A were mixed for 15 min under a reduced pressure of 10 mmHg in a universal mixer with moisture being cut off. Then, 6 parts of tetramethoxysilane as a crosslinking agent and 1 part of TPT as a condensation catalyst were mixed with the thus obtained mixture under a reduced pressure of 10 mmHg to obtain a composition (ii) (Comparative Example 1).

These compositions were subjected to the slump test in accordance with JIS-A-5758. These compositions were also formed into sheets having a thickness of 2 mm, the sheets were allowed to cure at 20° C. and 55% RH for 7 days, and rubber physical properties of the thus obtained cured products were measured in accordance with JIS-K-6301. Further, part of each of the compositions was hermetically closed and kept for 7 days in a dryer at 70° C. to accelerate deterioration, and rubber physical properties were similarly measured to check the shelf stability. Herein, the transparency of the cured product was evaluated in such a manner that the light transmittance of the cured product with a thickness of 2 mm at 400 nm was measured by an autographic spectrophotometer. The results are shown in Table 1.

EXAMPLE 2 AND COMPARATIVE EXAMPLE 2

100 parts of the oil C obtained in Synthesis Example 2 and 9 parts of dry process finely divided silica having a specific surface area of 200 m$^2$/g and an adsorbed water content of 0.1% (whose surface had not been treated, and which is referred to as silica B hereinafter) were mixed for 15 min under a reduced pressure of 10 mmHg in a universal mixer with moisture being cut off. Then, 0.1 part of dibutyltin octoate (BTO, a condensation catalyst) and 3 parts of MKS (crosslinking agent) were mixed with the thus obtained mixture under a reduced pressure of 10 mmHg to obtain a composition (iii) (Example 2).

For comparison, all the components were mixed at the same time together uniformly in the same manner as in Example 2, except that in place of 100 parts of oil C, 100 parts of oil A was used, and the amount of MKS was changed to 8 parts, thereby obtaining a composition (iv).

With respect to these compositions, similar measurement to that of Example 1 was carried out, the results being also shown in Table 1.

EXAMPLE 3 AND COMPARATIVE EXAMPLE 3

100 parts of the oil D obtained in Synthesis Example 3 and 12 parts of dry process finely divided silica having a specific surface area of 120 m²/g and an adsorbed water content of 0.1% (whose surface had been treated with octamethylcyclotetrasiloxane and which is referred to as silica C hereinafter) were mixed for 15 min under a reduced pressure of 10 mmHg in a universal mixer with moisture being cut off.

Then, 0.5 part of N-trismethoxysilylpropyltetramethylguanidine (TTG, a condensation catalyst) and 3 parts of VIS (crosslinking agent) were mixed with the resulting mixture under a reduced pressure of 10 mmHg to obtain a composition (v) (Example 3).

Further, for comparison, 100 parts of oil A, 12 parts of silica C, and 0.3 part of triethylene glycol (slump preventive, TEG) were mixed for 15 min under a reduced pressure of 10 mmHg in a universal mixer with moisture being cut off.

Then, 9 parts of VIS as a crosslinking agent and 0.5 g of TTG as a condensation catalyst were mixed with the resulting mixture under a reduced pressure of 10 mmHg to obtain a composition (vi) (Comparative Example 3).

With respect to these compositions, similar measurement to that of Example 1 was carried out, the results being also shown in Table 1.

TABLE 1

| | Example No. | | | Comparative Example No. | | |
|---|---|---|---|---|---|---|
| | 1 | 2 | 3 | 1 | 2 | 3 |
| | Composition No. | | | Composition No. | | |
| | i | iii | v | ii | iv | vi |
| Oil A | | | | 100 | 100 | 100 |
| Oil B | 100 | | | | | |
| Oil C | | 100 | | | | |
| Oil D | | | 100 | | | |
| Silica A | 10 | | | 10 | | |
| Silica B | | 9 | | | 9 | |
| Silica C | | | 12 | | | 12 |
| TPT | 1 | | | 1 | | |
| BTO | | 0.1 | | | 0.1 | |
| TTG | | | 0.5 | | | 0.5 |
| TMS | | | | 6 | | |
| VMS | 3 | | | | | |
| MKS | | 3 | | | 8 | |
| VIS | | | 4 | | | 9 |
| TEG | | | | | | 0.3 |
| Slump (mm) | 0 | 0 | 0 | 10 | >10 | 0 |
| Hardness* (JIS-A) | 20 | 25 | 30 | 18 | 20 | 30 |
| Elongation (%) | 350 | 400 | 450 | 390 | 420 | 440 |
| Tensile strength (kgf/cm²) | 15 | 20 | 25 | 14 | 15 | 24 |
| (After storage) | | | | | | |
| Hardness* (JIS-A) | 20 | 26 | 30 | 10 | 27 | 30 |
| Elongation (%) | 380 | 400 | 440 | 500 | 360 | 450 |
| Tensile strength (kgf/cm²) | 14 | 21 | 24 | 10 | 20 | 25 |
| Light transmittance (%) | 22 | 21 | 20 | 18 | 7 | 2 |

Note:
the hardness was measured by using an A-type hardness spring tester of JIS K 6301.

EXAMPLE 4 AND COMPARATIVE EXAMPLE 4

1,000 g of α, β-dihydroxydimethylpolysiloxane (having a viscosity of 20,000 cSt and a hydroxyl group content of 0.004 mol per 100 g, and hereinafter referred to as oil E) and 15 g of methyltris(methylethylketooxime)silane (MMKS) were mixed for 15 min under a reduced pressure of 10 mmHg in a universal mixer with moisture being cut off.

Then, 150 g of dry process finely divided silica having a specific surface area of 150 m²/g and an adsorbed water content 0.1% (which had a total OH group content of 0.003 mol/g, whose surface had been treated with dimethyldichlorosilane, and which is referred to as silica D hereinafter) was added to and mixed with the resulting mixture under reduced pressure.

Further, 48 g of MMKS, 1.0 g of dibutyltin dioctoate (BTO), and 10 g of aminopropyltrimethoxysilane (APMS) were mixed with the thus obtained mixture to obtain a curable composition 1 (Example 4).

Further, for comparison, the above procedure was repeated, except that the first added amount of MMKS was changed to 6 g and the second added amount of MMKS was changed to 54 g, thereby preparing a curable composition 2 (Comparative Example 4).

With respect to these compositions, similar measurement to that in Example 1 was carried out, as well as the time required for the surface of the composition to become free from tack (hereinafter referred to as tack-free time) was measured, and the movement crack test was carried out in accordance with JIS-A-5758. The results are shown in Table 2.

EXAMPLE 5 AND COMPARATIVE EXAMPLE 5

1,000 g of oil E and 24 g of vinyltris(methylethylketooxime)silane (VMKS) were mixed for 15 min under a reduced pressure of 10 mmHg in a universal mixer with moisture being cut off.

With the thus obtained mixture, 100 g of dry process finely divided silica having a specific surface area of 150 m²/g and an absorbed water content of 0.1% (which had a total OH group content of 0.000 5 mol/g, whose surface had been treated with hexamethyldisiloxane, and which is hereinafter referred to as silica E) was mixed under reduced pressure, and then further, 48 g of VMKS and 1.0 g of BTO were mixed with the thus obtained mixture under reduced pressure to prepare a curable composition 3 (Example 5).

Further, for comparison, the above procedure was repeated, except that all (72 g) the amount of VMSK was added at a time, thereby preparing a curable composition 4 (Comparative Example 5).

With respect to these composition 4 and 5, similar measurement to that in Example 4 was carried out The results are shown in Table 2.

EXAMPLE 6 AND COMPARATIVE EXAMPLE 6

1,000 g of E and 36 g of MMKS were mixed for 15 min under a reduced pressure of 10 mmHg in a universal mixer with moisture being cut off.

With this mixture, 120 g of dry finely divided silica having a specific surface area of 200 m²/g and an adsorbed water content of 0.1% (which had a total OH group amount of 0.0014 mol/g, whose surface had not been treated, and which is referred to as silica F hereinafter) was mixed under reduced pressure, and further 60 g of VMKS and 1.5 g of BTO were mixed with the thus obtained mixture under reduced pressure, thereby preparing a curable composition 6 (EXAMPLE 6).

The above procedure was repeated, except that the MMKS was not mixed before the mixing of the silica F but was mixed simultaneously with the mixing of VMKS, thereby preparing a curable composition 7 (Comparative Example 7).

With respect to these compositions 6 and 7, similar measurement to that in Example 4 was carried out. The results are shown in Table 2.

TABLE 2

|  | Example No. | | | Comparative Example No. | | |
| --- | --- | --- | --- | --- | --- | --- |
|  | 4 | 5 | 6 | 4 | 5 | 6 |
|  | Composition No. | | | Composition No. | | |
|  | 1 | 3 | 5 | 2 | 4 | 6 |
| Composition (g) | | | | | | |
| Oil A | 1,000 | 1,000 | 1,000 | 1,000 | 1,000 | 1,000 |
| MMKS (first addition) | 12 | | 36 | 6 | 72 | |
| VMKS (first addition) | | 24 | | | | |
| Silica A | 100 | | | 100 | | |
| Silica B | | 90 | | | 90 | |
| Silica C | | | 120 | | | 120 |
| MMKS (second addition) | 48 | | | 54 | | 39 |
| VMKS (second addition) | | 48 | 48 | | | 48 |
| BTO | 1.0 | 1.0 | 1.0 | 1.0 | 1.0 | |
| APMS | 10 | | | 10 | | |
| Physical properties | | | | | | |
| Slump (mm) | 0 | 0 | 0 | 5 | 0 | 10 |
| Tack-free time (min) | 6 | 5 | 5 | 3 | 2 | 2 |
| Hardness (JIS-A) | 34 | 35 | 40 | 35 | 32 | 39 |
| Elongation (%) | 350 | 400 | 450 | 360 | 420 | 440 |
| Tensile strength (kgf/cm²) | 23 | 22 | 28 | 24 | 22 | 28 |
| (after storage) | | | | | | |
| Hardness (JIS-A) | 33 | 35 | 40 | 33 | 30 | 40 |
| Elongation (%) | 380 | 400 | 400 | 400 | 420 | 450 |
| Tensile strength (kgf/cm²) | 22 | 21 | 25 | 22 | 22 | 25 |
| Light transmission (%) | 31 | 28 | 28 | 28 | 20 | 23 |
| Movement crack test | not cracked | not cracked | not cracked | not cracked | cracked | not cracked |

We claim:

1. A process of producing a room temperature curable organopolysiloxane composition, comprising the steps of mixing uniformly 100 parts by weight of (A) at least one component selected from the group consisting of an organopolysiloxane represented by the following general formulas (1) and (2):

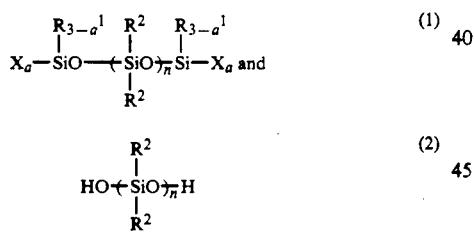

wherein each X, which may be the same or different, represents a group selected from the group consisting of an acyloxy group, an alkoxy group, an alkenyloxy group, and a ketooxyimino group, $R^1$ and $R^2$, which may be the same or different, each represent an unsubstituted or substituted monovalent organic group, n is a positive integer, and a is 2 or 3, and 1 to 50 parts by weight of (B) a silica powder having a specific surface area of 50 m²/g or more and an adsorbed water content of 0.5% or less, and then mixing with mixture (A) and (B) 0 to 10 parts by weight of a condensation catalyst (C), provided that when said organopolysiloxane (A) is represented by the general formula (2), a crosslinking agent of at least one compound selected from the group consisting of iminoxysilanes represented by the following formulas (3) and (4):

$$R_{4-b}{}^3Si(ON=CR^4)_b, \text{ and} \qquad (3)$$

$$R_{4-b}{}^3Si(ON=C\,R^5)_b \qquad (4)$$

wherein $R^3$ and $R^4$, which may be the same or different, each represent an unsubstituted or substituted monovalent hydrocarbon group, $R^5$ represents an unsubstituted or substituted bivalent hydrocarbon group, and b is an integer of 2 to 4, is uniformly added in a crosslinking amount in two steps, part of said iminoxysilanes being added before the addition of said silica powder (B) and the remainder being added after the addition of said silica powder (B).

2. A process as claimed in claim 1, wherein said organopolysiloxane (A) is represented by the general formula (1).

3. A process as claimed in claim 1, wherein said organopolysiloxane (A) is represented by the general formula (2).

4. A process as claimed in claim 3, wherein said iminoxysilane is mixed in a molar amount 3 to 20 times the molar amount of the hydroxyl group of said organopolysiloxane (A).

5. A process as claimed in claim 4, wherein the amount Y (mol) of said iminoxysilane to be added before the mixing of the finely divided silica (B) satisfies the following formula:

$$A_{OH} < Y < A_{OH} + 1.5 B_{OH}$$

wherein $A_{OH}$ represents the total molar mount of the hydroxyl group of the organopolysiloxane which is the component (A), and $B_{OH}$ represents the total molar amount of the hydroxyl groups of the finely divided silica which is the component (B) and the remainder of said iminoxysilane is mixed after mixing of the finely divided silica (B).

* * * * *